July 7, 1964  F. A. LANG ETAL  3,139,728
SELF-CONTAINED VALVE ACTUATOR
Filed April 18, 1963  3 Sheets-Sheet 1

INVENTORS
FREDERIC A. LANG
EUGENE F. HOLBEN
BY
Herman Foster
ATTORNEY

INVENTORS
FREDERIC A. LANG
EUGENE F. HOLBEN
BY Herman Foster
ATTORNEY

United States Patent Office 3,139,728
Patented July 7, 1964

3,139,728
SELF-CONTAINED VALVE ACTUATOR
Frederic A. Lang, Landenberg, and Eugene F. Holben, North Wales, Pa., assignors, by direct and mesne assignments, to Conoflow Corporation, a corporation of Pennsylvania
Filed Apr. 18, 1963, Ser. No. 273,861
9 Claims. (Cl. 60—57)

This invention relates to a valve positioning apparatus, and particularly to pneumatic type valve actuating apparatus of self-contained design suitable for location as an entity in the immediate proximity of a valve positioned thereby.

This application is a continuation-in-part of application Serial No. 854,064, filed November 19, 1959, and now abandoned.

Pneumatic power actuation of valve positioning has desirable operating characteristics, but the full potential has not hitherto been realized because of dependence on a more or less central air pressure supply. This has been objectionable due to the inconvenience and high cost of long gas pressure supply lines running to a multiplicity of separate valves. Moreover, a shutdown of the central air supply for any reason unavoidably immobilized all valves serviced thereby, and the consequences in such an event were so serious in many installations as to militate strongly against a reliance on pneumatic powering.

Further, there are conditions under which it is desirable to have a valve actuated by a positioner which is independently operable without supervision and regardless of the external atmospheric conditions.

This invention has for an object the provision of a pneumatic powered valve actuating system which is adapted to service a single valve solely and, therefore, obviates completely the expense of gas pressure supply lines. In addition, the invention utilizes gas compressors of the household refrigerator type, which are compact, trouble-free and inexpensive in first cost and maintenance. Finally, the valve actuating system of this invention makes use of a closed gas circuit for the operating gas, thus insuring the cleanliness and availability of a substantially dry supply even where the apparatus is located in dusty or corrosive atmospheres or, in the extreme situation, where the apparatus is completely submerged.

Another object is the provision of a pneumatic powered valve actuator which has a sealed system and which provides its own operating atmosphere and interior pressure differences, thereby making its operation independent of the existence or non-existence of an external atmosphere.

Various other objects and advantages will appear from the following description of the several embodiments of the invention, and the novel features will be particularly pointed out hereinafter in connection with the appended claims.

Figure 1:
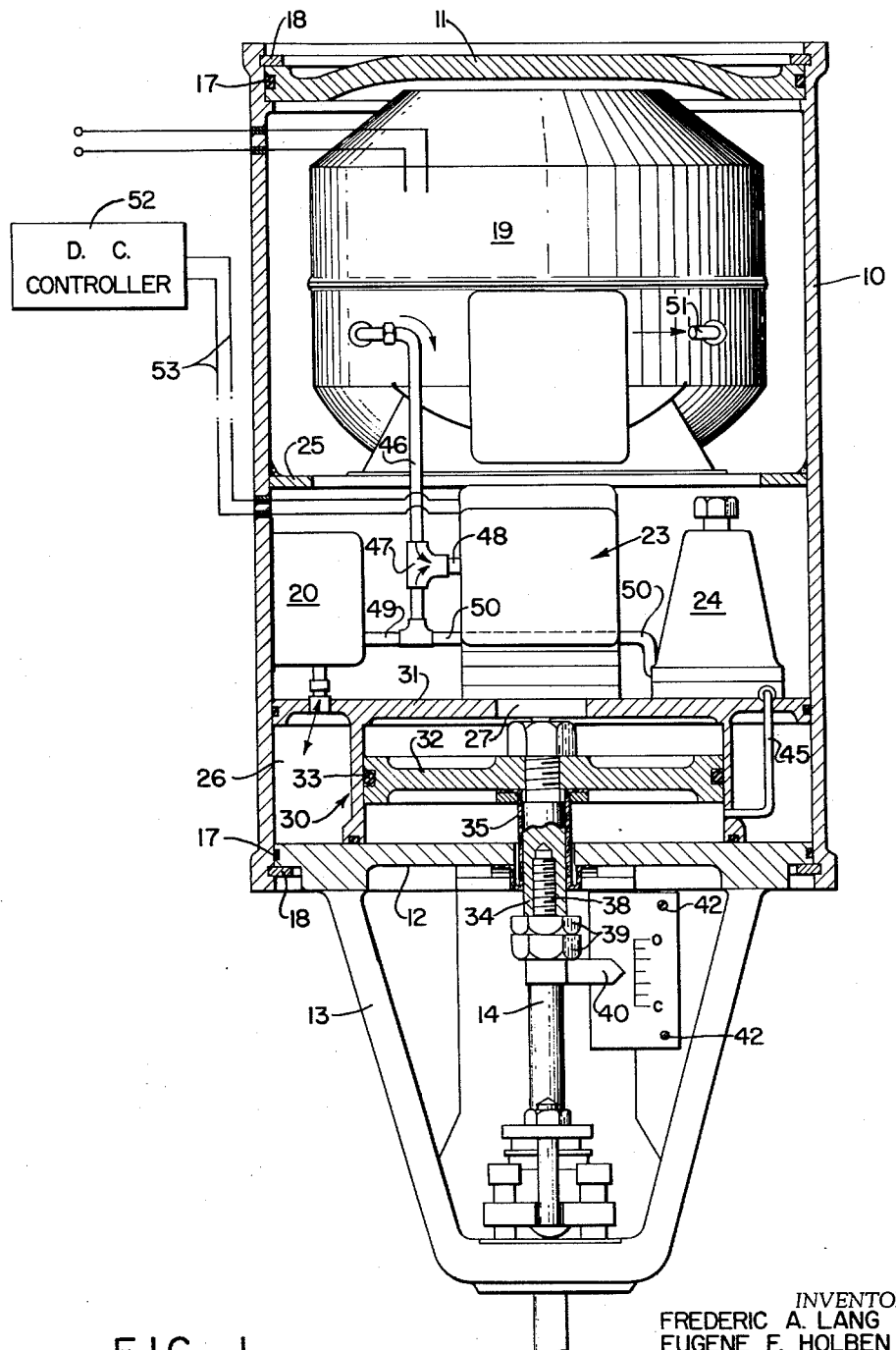
FIG. 1 is a vertical partial section of a complete actuator combination showing a relationship of the parts within a sealed enclosure.

Generally, our invention comprises valve actuating apparatus adapted to be mounted in proximity to the valve positioned thereby which is provided with an individual power-driven gas compressor supplying a gas pressure-actuated transducer-valve positioner, which latter is responsive to a valve position controller, and an hermetically sealed enclosure to which the transducer-valve positioner exhausts and from which the gas compressor draws its intake, thereby insuring a completely closed operating gas circuit. As a conjoint effect is the creation of a new atmosphere within the sealed circuit. Instead of measuring pressures relative to the earth's atmosphere (approximately 14.7 p.s.i. absolute), the pressures are now relative to the suction reservoir pressure. Thus, regardless of the relation of the pressures inside the system to that outside the system the system will operate properly as long as the pressures within the system relative to the suction reservoir are properly maintained.

Referring to the drawing, the apparatus consists of a compact assembly which is preferably housed in the entirety within an hermetically sealed enclosure 10 which is cylindrical in form and closed at top and bottom by disked head 11 and flat head 12, respectively. Head 12 is provided with a yoke 13 guiding the reciprocatory stem 14 which positions the valve by direct driving connection with its slide, or through an intermediary rack and pinion, or like device, not shown. Both of the heads are preferably sealed tightly against gas leakage therearound by O-rings 17 backed by spring type metal sealing rings 18, which rings also lock the several components into a rigid assembly.

The upper three-fourths of enclosure 10 constitutes mounting space housing gas compressor 19, provided with an integral electric driving motor, not shown, which may be a commercial household type refrigerator ⅓ H.P. compressor, pressure switch 20, the upper end of the transducer-valve positioner, indicated generally at 23, and pressure regulator 24. For convenience in piping, compressor 19 is disposed at the top, its weight being carried by annular flange 25 welded around the outside periphery to the inner wall of enclosure 10.

Pressure switch 20 is a commercial type connected in the electrical circuit of the driving motor of compressor 19, so as to initiate operation of the compressor whenever the pressure in reservoir 26, hereinafter described, falls below about 100 lbs./sq. in., and to thereafter terminate such operation when the pressure rises above about 150 lbs./sq. in. Transducer-valve positioner 23 is also a commercial type, such as the Moore Products Co. Model 75 force-balance unit, which opposes the movement of an electromagnetically biased piston, responsive to a D.-C. control signal input, to that of a pilot valve which continuously bleeds to the interior of enclosure 10. This force balancing in turn actuates a spring-loaded poppet within the transducer 23 which supplies air at about 50 lbs./sq. in. gage to port 27, to thereby effect the actual positioning of the valve.

The valve positioner per se, indicated generally at 30, is disposed at the bottom of enclosure 10 and consists of a short length cylinder defined at the upper end by circular partition 31, extending across the entire diameter of enclosure 10, and at the lower end by the flat head 12. The positioner is centrally located with respect to the center of enclosure 10, and is of smaller diameter than the enclosure, thereby providing an annular surrounding space which serves as the reservoir 26. The valve positioner is provided with a reciprocatory piston 32, sealed against leakage therearound by an O-ring 33, and the underside is sealed against leakage along the piston rod 34 by a flexible sleeve 35 anchored at each end and adjusting itself in length to accommodate for any position piston 32 may take throughout its full stroke. Stem 14 is attached at its upper end to the lower end of piston rod 34 by internal screw threads 38 and locknuts 39, and carries an attached pointer 40 which moves vertically with reference to a stationary scale 41 mounted by screws 42 on yoke 13, thereby visually indicating the position occupied by the valve serviced by the apparatus at any particular time.

Figure 3:
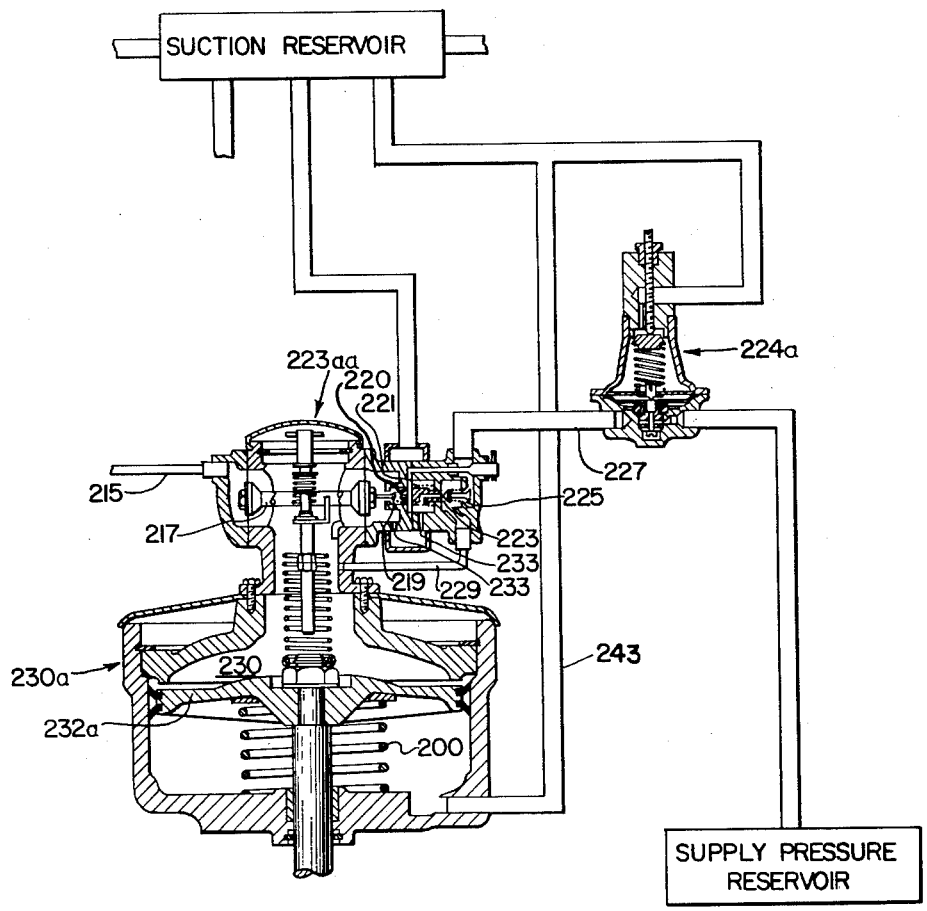
FIG. 3 is a schematic illustration similar to FIG. 2 of a portion of still another embodiment of our actuator combination.

Pressure regulator 24 is connected by conduit 45 to the underside of piston 32, thereby affording a countervailing pressure on the piston, a suitable constant or set pressure being about 20 lbs./sq. in. gage. It will be particularly understood that the use of gas pressure biasing through the agency of a pressure regulator such as 24 is particularly advantageous because a substantially zero spring scale is thereby achieved. For particular reasons, as shown in FIG. 3, a spring may be used in lieu of the biasing gas pressure. The remaining gas pressure piping is very simple and consists of the compressor pressure delivery line 46 which is connected via T 47 to the transducer-valve positioner inlet 48 and also by line 49 in open communication through pressure switch 20 to reservoir 26. A branch connection 50 runs from 49 to the inlet side of pressure regulator 24, which is thereby supplied with pressurized gas, and intake 51 to the compressor is a stub connection open to the interior space of enclosure 10.

It will be understood that any gas discharged by bleeding from transducer-valve positioner 23 and from pressure regulator 24 is confined within enclosure 10 and is recycled by return to the compressor through intake 51. This is also true of any slight gas leakage through the fittings or out of the several apparatus components, so that a clean atmosphere always exists as regards the operating gas. It is preferred to employ one of the commercially available lower boiling chlorinated fluorinated hydrocarbons, such as those customarily employed as refrigeration media and aerosol propellents, as the pressurized gas for the apparatus, because of their ready availability and lack of affinity for lubricants and materials of construction; however, if desired, other gases such as nitrogen or even clean, dry air are completely satisfactory in this service.

Reservoir 26 in open communication at all times with compressor delivery line 46 and the inlet of transducer-valve positioner 23 affords a reserve of pressurized gas which insures that the heaviest valve positioning demand will not exceed the performance capacity of the apparatus. At the same time, the reservoir permits of relatively sustained compressor operation at widely spaced time intervals, rather than the more severe condition of high frequency short term intermittent operation.

In the usual applications, the valve positioning apparatus will be controlled by a more or less remotely located conventional D.-C. electrical controller, represented schematically at 52, which is connected in electrical circuit with the electromagnetic operating coil of transducer-valve positioner 23 by leads 53. The controller is preferably located in a central control room together with the controllers for other valves, although there is complete freedom of choice as to such location. Under these conditions, the only connections which need be made to the apparatus are those supplying electric power to the compressor motor, and the control signal leads. Both electrical leads are sealed at their entry points through the enclosure 10.

In operating from startup, a brief period must be allowed for compressor 19 to build up to the proper pressure level at which there is enough available gas pressure energy stored in the system to insure precision valve positioning within the time intervals desired. Thereafter, operation in conformity with either a continuously sensed process parameter, or intermittently at the will of the operator, is attained by applying the appropriate control signal to leads 53 in entirely conventional manner. Generally, 1" valves with a stroke of ¾"–1¼" require operators delivering a thrust of about 500 lbs. Similarly, 2" valves with a stroke of 1"–1½" necessitate delivery of a thrust of about 800 lbs. Full stroke time should not exceed 5–10 seconds and, in normal service, will not be less than about 1 second, although an apparatus constructed according to this invention proved effective with full stroke times as short as 0.1–0.2 second. It will be understood that response characteristics are a matter for detailed design, and the apparatus of this invention affords a very wide latitude in this regard. Usually a response of stem position to the extent of 90–95% within a time interval of 1 second for the application of a sudden 10% input change at mid scale is satisfactory, and this is easily obtainable.

An incidental advantage of our valve positioner is the fact that reservoir 26 provides emergency operating capacity for more or less extensive valve operation even if there is a power failure as regards the electricity supply to the compressor motor. Higher factors of safety for particularly critical valves can be readily provided in the form of higher pressure or larger capacity reservoirs, because each positioner is individual to its specific valve and there is no competition as to the operating pressure demand between different valves, as exists where centralized pressure supplies are utilized.

Figure 2:
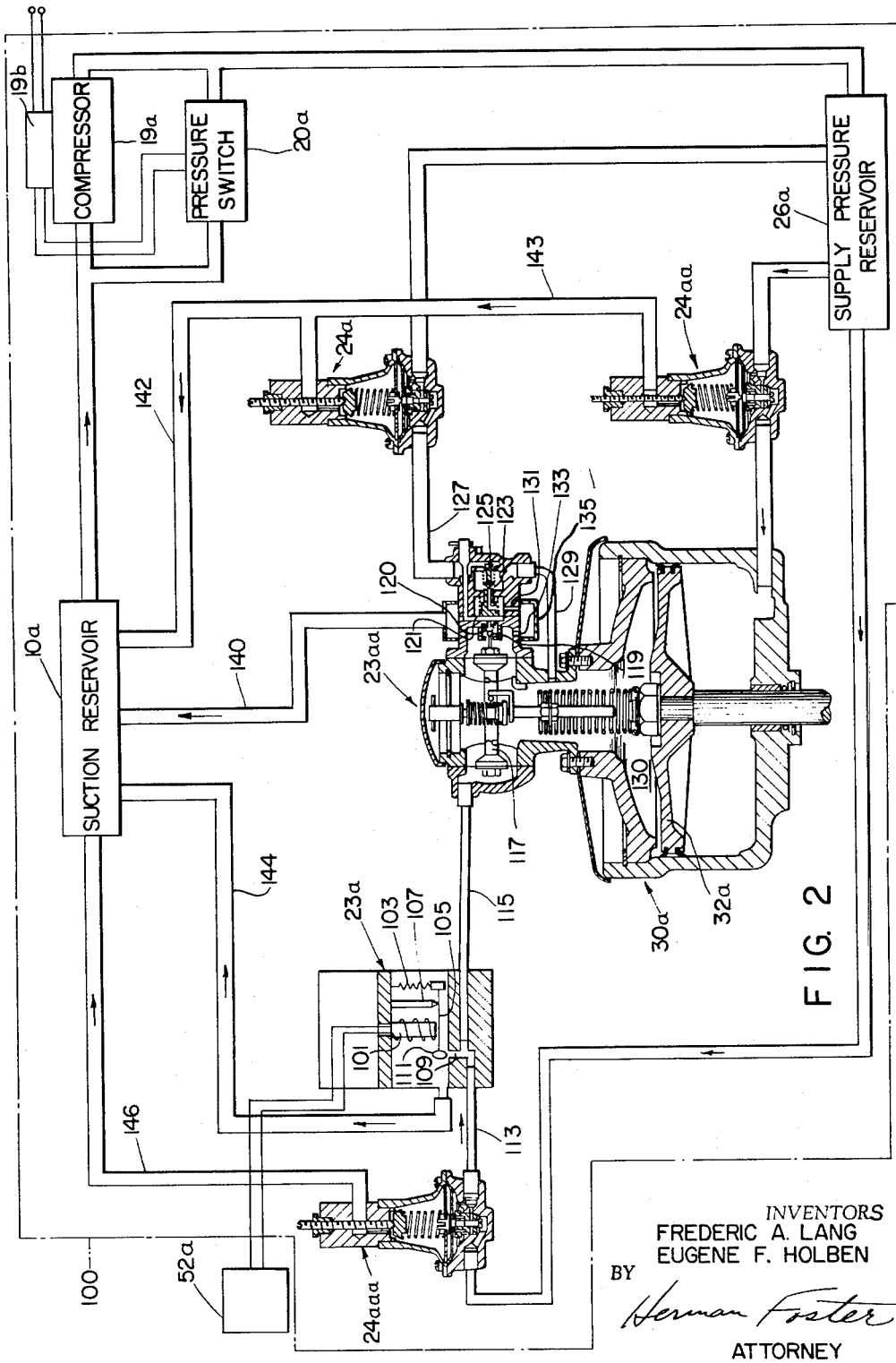
FIG. 2 is a schematic illustration of the relationship of the parts of another embodiment of our novel combination which shows how the parts may be joined without the use of a sealed enclosure or, if used with a sealed enclosure, without regard to their actual position in the sealed enclosure.

In FIG. 2 there is shown the relationship of the components which are considered to be the most desirable of the broad concept. In describing this embodiment the same numerals as in FIG. 1 have been used with an additional subscript "a" to relate components of the FIG. 2 embodiment with those of FIG. 1. For example, 10a depicts the suction reservoir in FIG. 2 which would correspond to the interior of the sealed enclosure 10 of FIG. 1. The compressor 19a which is generally shown in FIG. 2 by a box is again constituted of a household type compressor having an integral electric motor which is here noted schematically as 19b. The system shown in FIG. 2 may be used as is diagrammatically indicated without a casing and with all the components inter-connected and venting to the suction reservoir. This arrangement is particularly suitable where the power to be generated is quite large. In instances where a relatively small power unit is required, the components may be enclosed in a container indicated here in phantom as 100. In this latter case the parts would bear the operative relation shown in FIG. 2 except that the interior of the container would be the suction reservoir and all the components would vent into it in the manner similar to the FIG. 1 embodiment.

Adjacent the compressor is a pressure switch 20a which is a commercial type which is connected into the electrical motor drive of the compressor 19a. At 23a is indicated an electro-pneumatic transducer which may be a commercially available type such as the Model T-10 sold by Conoflow Corporation. The transducer is connected to a pneumatic positioner indicated at 23aa. This too may be a commercial type such as that available as the Model J positioner from Conoflow Corporation. To operate most effectively, it is desirable that the positioner operate at a controlled pressure which will be determined by the pressure regulators 24a and 24aa. The power unit per se of the positioner is generally indicated by 30a. As a practical matter the supply pressure reservoir 26a will be in close proximity to the power unit 30a. However, for illustrative purposes it has been shown here as a separate entity. The remaining item in this general arrangement is the pressure regulator 24aaa which feeds the transducer 23aa controlled supply pressure from the supply pressure reservoir 26a.

In operation the system acts as follows:

A signal demanding more or less flow will be transmitted to the system usually by a remotely located controller 52a. Assuming in this instant that the signal is for less flow, less electric current will be transmitted from the controller 52a to the electromagnet 101 in the transducer 23a. This will diminish the pull of the magnet and thereby permit spring 103 to pull arm 105 about pivot 107 to close vent 109 by means of valve member 111.

This, thereby, increases the flow of gas from regulator 24aaa to the positioner 23aa through pipes 113 and 115. In practice, the maximum output of 24aaa is normally limited to 25 p.s.i.

As the so-called instrument gas through line 115 increases, the yoke 117 is forced to the right causing the ball 119 in the pilot nozzle assembly 120 to restrict the nozzle opening thereby building up the pressure behind the nozzle and causing pilot diaphragm 121 to move to the right. This causes the exhaust valve 123 to close and the supply valve 125 to open thereby permitting gas to flow from regulator 24a through pipes 127 and 129 into the chamber 130 to force the piston 32a downwardly and thus close a valve (not shown). In practice the setting of regulator 24a will be such as to deliver gas at approximately 40 p.s.i., while the regulator 24aa will be set to maintain the cushion loading on the underside of piston 32a at between 25 to 30 p.s.i.

A decrease in the instrument gas pressure reverses the above procedure, closing the supply valve 125 and opening the exhaust valve 123, thereby venting, through vents 131 and 133, the excess gas pressure above piston 32a. A collar 135 is shown surrounding these vents to carry the exhausted gas back to the suction reservoir by means of line 140. It should be understood, however, that while lines 140, 142 and 143, 144 and 146 are depicted as exhaust lines which carry the gas back to a suction reservoir 10a, the suction reservoir in reality may be the interior of a casing in which these components may be contained, thus negating the necessity for these lines.

While the above description has been based on the principle of having a constant resisting force on the underside of the piston 32a there may be times when a system will have a service requirement of a variable resisting force under the piston. This can be most suitably obtained by using a spring of a desired spring constant as the resisting force under the piston. Such an arrangement is shown in FIG. 3. One of the benefits derived from the use of a FIG. 3 embodiment is the greater compactness which will accrue because the requirement for a regulator such as 24aa is no longer present. Instead, the bottom of the piston area may now be vented directly to the suction reservoir as by 243.

In FIG. 3 the power unit is depicted by 230a and the positioner by 223aa. Since the accessory equipment for the FIG. 3 embodiment is the same as for the FIG. 2 embodiment, these have been omitted. As with the FIG. 2 embodiment the instrument gas from line 215 urges the yoke 217 to the right causing the ball 219 in the pilot nozzle assembly 220 to restrict the nozzle and causing pilot diaphragm 221 to move to the right. This closes the exhaust valve 223 and opens the supply valve 225 permitting gas to flow from line 227 through line 229 into the chamber 230 to force the piston 232a downwardly against spring 200 and thus close a valve (not shown). The operation of the ball 219 with respect to the pilot nozzle 220 and pilot diaphragm 221 is the same as the respective parts 119, 120 and 121 shown in FIG. 2. A decrease in the instrument gas will give the FIG. 3 embodiment a reverse procedure similar to that in FIG. 2. The spring 200 will move piston 232a upwardly as the gas above the piston is vented through vents 231 and 233 to the suction reservoir.

It will be understood that various changes in the details, materials, steps and arrangements of parts, which have been herein described and illustrated in order to explain the nature of the invention, may be made by those skilled in the art within the principle and scope of the invention as expressed in the appended claims.

We claim:

1. Apparatus for individually actuating a valve comprising:
   (A) a sealed intermittently operable electric motor driven gas compressor,
   (B) a high pressure gas reservoir and a relatively low pressure reservoir both sealingly connected to said compressor, said high pressure reservoir adapted to be maintained by said compressor,
   (C) a gas driven power cylinder having a piston therein for driving a valve stem and being movable in one direction and the opposite direction,
   (D) a gas operated positioner sealingly connected to said cylinder and said high pressure gas reservoir for transmitting high pressure gas to one side of said piston for movement of said piston in one direction,
      (1) said positioner having vents therein sealingly connected to said low pressure reservoir,
   (E) means on the other side of said piston for effecting resistance to movement of said piston in said one direction and for causing movement of said piston in the opposite direction when said high pressure gas on said one side is vented to said low pressure reservoir,
   (F) a transducer sealingly connected between said high pressure gas reservoir and said positioner for converting an external signal to the transmission of a gas pressure of preselected value to said positioner,
   (G) means sealingly connected between said transducer and said high pressure gas reservoir for transmitting a constant gas pressure to said transducer,
whereby said apparatus, all being sealingly interconnected, is operable regardless of pressures external of said apparatus.

2. Apparatus according to claim 1 wherein the means (E) on the other side of said piston is a pressure regulator having an inlet connected to said other side of said piston for maintaining a gas cushion at a preselected pressure on said other side of said piston.

3. Apparatus according to claim 1 wherein the means (E) on the other side of said piston is a spring.

4. Apparatus for individually actuating a valve comprising:
   (A) a sealed intermittently operable electric motor driven gas compressor having an intake and an outlet,
   (B) a high pressure gas reservoir and a relatively low pressure reservoir both sealingly connected to and adapted to be maintained by said compressor,
      (1) the high pressure reservoir being connected to said outlet,
      (2) the low pressure reservoir being connected to said intake,
   (C) a gas driven power cylinder having a piston therein for driving a valve stem and being movable in one direction and the opposite direction,
   (D) a gas operated positioner sealingly connected to said cylinder and said high pressure gas reservoir for transmitting high pressure gas to one side of said piston for movement of said piston in one direction,
      (1) said positioner having vents therein sealingly connected to said low pressure reservoir,
   (E) means sealingly connected between said positioner and said high pressure gas reservoir for transmitting a constant gas pressure to said positioner,
   (F) means on the other side of said piston for effecting resistance to movement of said piston in said one direction, and for causing movement of said piston in the opposite direction when said high pressure gas on said one side is vented to said low pressure reservoir,
   (G) a transducer sealingly connected between said high pressure gas reservoir and said positioner for converting an external signal to the transmission of a gas pressure of preselected value to said positioner,
   (H) means sealingly connected between said transducer and said high pressure gas reservoir for transmitting a constant gas pressure to said transducer,
whereby said apparatus, all being sealingly interconnected, is operable regardless of pressures external of said apparatus.

5. Apparatus according to claim 4 wherein the means (F) on the other side of said piston is a pressure regulator having an inlet connected to said other side of said piston for maintaining a gas cushion at a preselected pressure on said other side of said piston.

6. Apparatus according to claim 4 wherein the means (F) on the other side of said piston is a spring.

7. Apparatus for individually actuating a valve comprising:
- (A) an hermetically sealed container whose interior environs constitute a low pressure gas reservoir,
- (B) an intermittently operable electric motor driven gas compressor within said container, said compressor having an intake directly accessible to the interior of said container and an outlet,
- (C) a relatively high pressure reservoir connected to the outlet of said compressor and adapted to be maintained by said compressor,
- (D) a gas driven power cylinder within said container connected to said high pressure reservoir and having a piston therein for driving a valve stem and being movable in one direction and the opposite direction,
- (E) a gas operated positioner connected between said cylinder and said high pressure gas reservoir for transmitting high pressure gas to one side of said piston for movement of said piston in one direction,
  - (1) said positioner venting into the interior of said container,
- (F) means connected between said positioner and said high pressure gas reservoir for transmitting a constant gas pressure to said positioner, and said piston, and venting into the interior of said container,
- (G) means for effecting resistance to movement of said piston in said one direction and for causing movement of said piston in the opposite direction when said high pressure gas on said one side is vented into said container,
- (H) a transducer between said high pressure gas reservoir and another portion of said positioner for converting an external signal to a transmission of gas at a high pressure from the high pressure gas reservoir to said other portion of said positioner,
  - (1) said transducer venting into the interior of said container,
- (J) means connected between said transducer and said high pressure gas reservoir for transmitting a constant gas pressure to said transducer,
  - (1) said means venting into the interior of said container, whereby said apparatus, all being sealingly interconnected is operable regardless of pressures external of said apparatus.

8. Apparatus according to claim 7 wherein (G) the piston resisting and moving means is a pressure regulator connecting said high pressure reservoir and the other side of said piston and venting into the interior of said container,
- (A) said regulator maintaining a gas cushion at a preselected pressures on said other side of said piston.

9. Apparatus according to claim 7 wherein (G) the piston resisting and moving means is a spring.

References Cited in the file of this patent

UNITED STATES PATENTS

| | | |
|---|---|---|
| 913,853 | Rowntree | Mar. 2, 1909 |
| 1,993,612 | Lum | Mar. 5, 1935 |
| 2,308,731 | White | Jan. 19, 1943 |
| 2,597,050 | Audemar | May 20, 1952 |
| 2,644,307 | Blair | July 7, 1953 |
| 2,673,527 | Ashton et al. | Mar. 30, 1954 |
| 2,705,017 | Lewis | Mar. 29, 1955 |
| 2,879,781 | Gimson | Mar. 31, 1959 |